United States Patent
Bhujade et al.

(10) Patent No.: US 10,329,494 B2
(45) Date of Patent: Jun. 25, 2019

(54) SYSTEM AND PROCESS FOR PRODUCTION OF BIOFUEL

(71) Applicant: Reliance Industries Limited, Maharashtra (IN)

(72) Inventors: Ramesh Bhujade, Maharashtra (IN); Rajaram Shrimant Ghadge, Maharashtra (IN); Roshni Krishnarao Bahekar, Maharashtra (IN); Somesh Gupta, Maharashtra (IN); Nitin Nagwani, Maharashtra (IN); Piyush Jain, Maharashtra (IN); Nikhlesh Saxena, Maharashtra (IN); Pavan Kumar Konakandla, Maharashtra (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 0 days.

(21) Appl. No.: 15/760,509

(22) PCT Filed: Sep. 23, 2016

(86) PCT No.: PCT/IB2016/055695
§ 371 (c)(1),
(2) Date: Mar. 15, 2018

(87) PCT Pub. No.: WO2017/051365
PCT Pub. Date: Mar. 30, 2017

(65) Prior Publication Data
US 2018/0273850 A1    Sep. 27, 2018

(30) Foreign Application Priority Data

Sep. 24, 2015 (IN) .......................... 3641/MUM/2015
Oct. 1, 2015 (IN) .......................... 3750/MUM/2015

(51) Int. Cl.
*B01J 8/00* (2006.01)
*C10G 1/00* (2006.01)
(Continued)

(52) U.S. Cl.
CPC .................. *C10G 3/40* (2013.01); *C10L 1/02* (2013.01); *C10L 1/04* (2013.01);
(Continued)

(58) Field of Classification Search
CPC ... B01J 8/007; B01J 8/00; B01J 8/0015; B01J 8/005; C10G 1/00; C07C 1/00
(Continued)

(56) References Cited

U.S. PATENT DOCUMENTS

2004/0034262 A1    2/2004  Van de Beld et al.

FOREIGN PATENT DOCUMENTS

CN    104262089 A    1/2015
WO    2015086904 A1  6/2015

OTHER PUBLICATIONS

International Search Report for Internationai Application No. PCT/IB2016/055695, dated Dec. 16, 2016, 2 pages.
(Continued)

*Primary Examiner* — Thuan D Dang
(74) *Attorney, Agent, or Firm* — Westman, Champlin & Koehler, P.A.

(57) ABSTRACT

The present disclosure relates to a system and a process for producing biofuel. The system comprises at least one feed tank; a low pressure pump; a high pressure pump; a first heat exchanger; a second heat exchanger; a reaction vessel; a precipitation vessel; a first pressure let-down station; a third heat exchanger; a second pressure let-down station; a gas-liquid separator; and a biofuel separator. The process comprises pressurizing and heating a feed, followed by reforming the pressurized and heated feed to obtain a slurry. The
(Continued)

solids are separated from the slurry by precipitation to obtain a mixture comprising biofuel and the non-reformed feed. The mixture is then cooled and de-pressurized, followed by separation of gases and the non-reformed feed to obtain the biofuel. The system and process of the present disclosure can be used to produce biofuel from diverse, easily available and inexpensive starting material.

12 Claims, 1 Drawing Sheet

(51) Int. Cl.
- *C07C 1/00* (2006.01)
- *C10G 3/00* (2006.01)
- *C10L 1/02* (2006.01)
- *C10L 1/04* (2006.01)

(52) U.S. Cl.
CPC ........... *C10G 2300/1003* (2013.01); *C10G 2300/1011* (2013.01); *C10L 2200/0469* (2013.01); *C10L 2290/06* (2013.01); *C10L 2290/54* (2013.01); *Y02P 30/20* (2015.11)

(58) Field of Classification Search
USPC ........ 585/240, 241, 242; 422/187, 608, 610, 422/618, 625
See application file for complete search history.

(56) References Cited

OTHER PUBLICATIONS

Written Opinion for International Application No. PCT/IB2016/055695, dated Dec. 16, 2016, 5 pages.

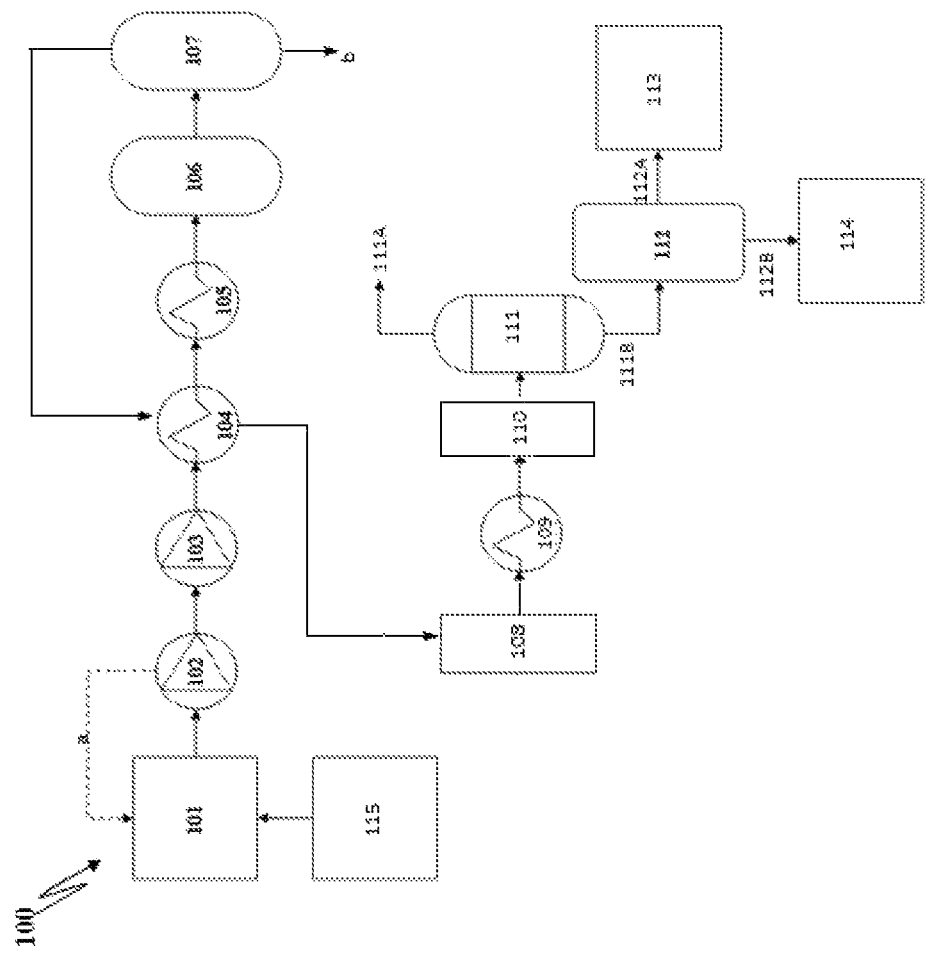

SYSTEM AND PROCESS FOR PRODUCTION OF BIOFUEL

CROSS-REFERENCE TO RELATED APPLICATION

This application is a Section 371 National Stage Application of International Application No. PCT/IB2016/055695, filed Sep. 23, 2016, and published as WO 2017/051365 A1, on Mar. 30, 2017, in English, which claims priority to Indian Patent Application Nos. 3641/MUM/2015 dated 24 Sep. 2015 and the Indian Patent Application No. 3750/MUM/2015 dated 1 Oct. 2015, under section 9 (2) of the Indian Patents Act, 1970, the entire contents of which are specifically incorporated herein by reference.

FIELD

The present disclosure relates to a system and a process for producing biofuel.

Definitions

As used in the present disclosure, the following terms are generally intended to have the meaning as set forth below, except to the extent that the context in which they are used indicates otherwise.

Reforming: The term "reforming" refers to a processing technique by which the molecular structure of a hydrocarbon is rearranged to alter its properties.

Aspen HYSYS: "Aspen HYSYS" is a process simulation software that is used by oil and gas producers, refineries and engineering companies for process optimization in design and operations.

UNIQUAC: Also known as "UNIversal QUAsiChemical" is an activity coefficient model used in description of phase equilibria.

BACKGROUND

There is an increasing demand for renewable energy source as an alternative to the traditionally used fossil fuels. Biofuels, produced through biological processes, such as agriculture and anaerobic digestion, rather than a fuel produced by geological processes, can be used as an alternative to the fossil fuels. Currently, biofuels are produced from various sources such as, algae, cellulose-containing organic matter, plants, fungi, and the like.

However, there are various social, economic, environmental and technical issues with biofuel production and use, including the effect of moderating oil prices, the "food vs fuel" debate, poverty reduction potential, carbon emissions levels, sustainable biofuel production, deforestation and soil erosion, loss of biodiversity, impact on water resources, as well as energy balance and efficiency. Hence, there is a need for utilizing an alternative source and process for the production of biofuels.

Objects

Some of the objects of the present disclosure, which at least one embodiment herein satisfies, are as follows:

An object of the present disclosure is to ameliorate one or more problems of the prior art or to at least provide a useful alternative.

An object of the present disclosure is to provide a system for production of biofuel.

Another object of the present disclosure is to provide a process for production of biofuel.

Still another object of the present disclosure is to produce biofuel using easily available and inexpensive starting material.

Other objects and advantages of the present disclosure will be more apparent from the following description, which is not intended to limit the scope of the present disclosure.

SUMMARY

The present disclosure relates to a system (100) for producing biofuel. The system comprises at least one feed tank (101) adapted for receiving and storing a feed; a low pressure pump (102); a high pressure pump (103); a first heat exchanger (104); a second heat exchanger (105); a reaction vessel (106); a precipitation vessel (107); a first pressure let-down station (108); a third heat exchanger (109); a second pressure let-down station (110); a gas-liquid separator (111); and a biofuel separator (112).

The low pressure pump (102) is adapted to pressurize the feed received from the at least one feed tank (101) to obtain a first pressurized feed having pressure up to 100 bars. At least a portion of the first pressurized feed (a) is recirculated back to the at least one feed tank (101). The high pressure pump (103) is adapted for receiving the remaining portion of the first pressurized feed from the low pressure pump (102) and increasing the pressure of the first pressurized feed up to 250 bar to obtain a second pressurized feed. The first heat exchanger (104) is adapted for receiving the second pressurized feed from the high pressure pump (103) and pre-heating the second pressurized feed to a temperature in the range of 200° C. to 290° C. to obtain a pre-heated feed. The second heat exchanger (105) is adapted for receiving the pre-heated feed from the first heat exchanger (104) and further heating the pre-heated feed to a temperature in the range of 291° C. to 400° C. to obtain a heated feed. The reaction vessel (106) is adapted for receiving the heated feed from the second heat exchanger (105) and reforming the heated feed for a time period in the range of 10 minutes to 60 minutes to obtain a slurry comprising solids, biofuel, and non-reformed fluid. The precipitation vessel (107) is adapted for receiving the slurry from the reaction vessel (106) and separating the solids (b) from the slurry to obtain a liquid mixture comprising biofuel and non-reformed feed having a temperature greater than 300° C. The liquid mixture from the precipitation vessel (107) is re-circulated to the first heat exchanger (104) for pre-heating the second pressurized feed, thereby cooling the liquid mixture to a temperature below 300° C. to obtain an intermediate cooled liquid mixture. The intermediate cooled liquid mixture is introduced to the first pressure let-down station (108) adapted for reducing the pressure of the intermediate cooled liquid mixture received from the first heat exchanger (104) in the range of 5 bar to 20 bar to obtain a de-pressurized liquid mixture. The third heat exchanger (109) is adapted to receive the de-pressurized liquid mixture and reduce the temperature of the de-pressurized liquid mixture in the range of 30° C. to 100° C., to obtain a cooled mixture. The second pressure let-down station (110) is adapted for receiving and reducing the pressure of the cooled liquid mixture to below 5 bar, and obtaining a gas-liquid mixture comprising gases and a mixture comprising biofuel and non-reformed feed. The gas-liquid separator (111) is adapted for receiving the gas-liquid mixture from the second pressure let-down station (110) and separating gases (111A) from the gas-liquid mixture to obtain a mixture (111B) comprising biofuel and non-reformed feed. The biofuel separator (112) is adapted for receiving the mixture (111B) comprising biofuel and non-reformed feed, from the gas-liquid separator (111) and separating the non-reformed feed (112B) from the mixture to obtain the biofuel (112A).

The present disclosure further provides a process for producing the biofuel. The process comprises collecting the feed and pressurizing up to 100 bar to obtain a first pressurized feed. A portion of the first pressurized feed is recirculated back to the feed tank. The remaining portion of the first pressurized feed is pressurized up to 250 bar to obtain a second pressurized feed. The second pressurized feed is heated to a temperature in the range of 200° C. to 400° C., followed by reforming the pressurized and heated feed to obtain a slurry comprising solids, biofuel and non-reformed feed. The solids are separated by precipitation to obtain a liquid mixture comprising biofuel and non-reformed feed. The liquid mixture is recirculated to the first heat exchanger to pre-heat the pressurized fluid, resulting in the cooling of the liquid mixture. The intermediate cooled liquid mixture is then de-pressurized in the first pressure let-down station to obtain de-pressurized liquid having a pressure in the range of 5 bar to 20 bars. The temperature of the de-pressurized liquid is further reduced to a temperature in the range of 30° C. to 100° C. to obtain a cooled mixture. The pressure of the cooled mixture is again reduced to below 5 bars to obtain a gas-liquid mixture. Gases and non-reformed feed are separated from the gas-liquid mixture to obtain the biofuel. Typically, the feed is selected from the group consisting of biomass, sludge and wastewater.

BRIEF DESCRIPTION OF THE ACCOMPANYING DRAWING

The present disclosure will now be described with the help of the accompanying drawing, in which:

FIG. 1 illustrates a block diagram of a system (100) for producing biofuel in accordance with the present disclosure.

DETAILED DESCRIPTION

Conventional fuels, such as, coal and petroleum is currently being used to satisfy the global energy requirements. However, these fuels are non-renewable and hence are depleting at a very fast rate. Therefore, alternative fuels that are derived from resources other than petroleum, are in great demand. Biofuels, produced through biological processes, such as agriculture and anaerobic digestion, rather than a fuel produced by geological processes, and can be used as an alternative to the fossil fuels. Currently, biofuels are produced from various sources such as, algae, cellulose-containing organic matter, plants, fungi, and the like.

However, there are various social, economic, environmental and technical issues with biofuel production and use, including the effect of moderating oil prices, the "food vs fuel" debate, poverty reduction potential, carbon emissions levels, sustainable biofuel production, deforestation and soil erosion, loss of biodiversity, impact on water resources, the possible modifications necessary to run the engine on biofuel, as well as energy balance and efficiency. Hence, there is a need for an alternative source to the conventionally used biofuels sources.

Further, a huge amount of domestic, industrial, agricultural waste is produced daily. Processing/disposal of the huge amount of these wastes are very expensive and can also have detrimental effect on the environment. Also, the wastewater treatment plants produce vast quantities of sludge on a daily basis. Environmental regulations and public health issues have made it necessary to find new techniques for managing the wastewater and the sludge. Sludge/wastewater contains a significant portion of lipids, which can be used for obtaining biofuels. The use of sludge/wastewater for production of biofuels is encouraged by both economic and environmental concerns, including reduction of greenhouse gas emissions, enhancement of the fuel supply, and maintenance of the rural economy.

The present disclosure envisages a system and a process for producing biofuel from easily available and inexpensive starting material (feed), such as, biomass slurry, sludge, wastewater, and the like.

The present disclosure in an aspect of provides a system (100) for producing biofuel. The system (100) as illustrated in FIG. 1 comprises the following:
  at least one feed tank (101) adapted for receiving and storing a feed;
  a low pressure pump (102) adapted for:
    pressurizing the feed up to 100 bar to obtain a first pressurized feed; and
    recirculating at least a portion (a) of the first pressurized feed received from the low pressure pump (102) back to the at least one feed tank (101);
  a high pressure pump (103) adapted for:
    receiving the remaining portion of the first pressurized feed from the low pressure pump (102); and
    increasing the pressure of the first pressurized feed up to 250 bar to obtain a second pressurized feed;
  a first heat exchanger (104) adapted for:
    receiving the second pressurized feed from the high pressure pump (103); and
    pre-heating the second pressurized feed to a temperature in the range of 200° C. to 290° C. to obtain a pre-heated feed;
  a second heat exchanger (105) adapted for:
    receiving the pre-heated feed from the first heat exchanger (104); and
    further heating the pre-heated feed to a temperature in the range of 291° C. to 400° C. to obtain a heated feed;
  a reaction vessel adapted (106) for:
    receiving the heated feed from the second heat exchanger (105); and
    reforming the heated feed for a time period in the range of 10 minutes to 60 minutes to obtain a slurry comprising solids, biofuel, and non-reformed feed;
  a precipitation vessel (107) adapted for:
    receiving the slurry from the reaction vessel (106); and
    separating the solids (b) from the slurry to obtain a liquid mixture comprising biofuel and non-reformed feed having a temperature greater than 300° C.,
    wherein the liquid mixture from the precipitation vessel is re-circulated to the first heat exchanger (104) for pre-heating the second pressurized feed, thereby cooling the liquid mixture to a temperature below 300° C. to obtain an intermediate cooled liquid mixture;
  a first pressure let-down station (108) adapted for:
    receiving the intermediate cooled liquid mixture from the first heat exchanger (104); and
    reducing the pressure of the intermediate cooled liquid mixture in the range of 5 bar to 20 bar to obtain a de-pressurized liquid mixture;
  a third heat exchanger (109) adapted for:
    receiving the de-pressurized liquid mixture from the first pressure let-down station (108); and reducing the temperature of the de-pressurized liquid mixture to a temperature in the range of 30° C. to 100° C. to obtain a cooled liquid mixture;

a second pressure let-down station (110) adapted for:
receiving the cooled liquid mixture from the third heat exchanger (109); and
reducing the pressure of the cooled liquid mixture to below 5 bar, to obtain a gas-liquid mixture comprising gases and a mixture comprising biofuel and non-reformed feed;

a gas-liquid separator (111) adapted for:
receiving the gas-liquid mixture from the second pressure let-down station (110); and
separating gases (111A) from the gas-liquid mixture to obtain the mixture (111B) comprising biofuel and non-reforming feed; and a biofuel separator adapted (112) for:
receiving the mixture comprising biofuel and non-reforming feed, from the gas-liquid separator (111); and
separating the non-reformed feed (112B) from said mixture to obtain the bio-fuel (112A).

The at least one feed tank (101) comprises at least one agitator, a level controller, and at least one atmospheric vent.

The system further comprises a process tank (115). The process tank is adapted to receive, store, and circulate a feed in the at least one feed tank (101). The feed is selected from the group consisting of biomass slurry, sludge and wastewater.

In one embodiment of the present disclosure, the precipitation vessel (107) comprises at least one filter. In one embodiment, the filter is sintered candle type filter.

The first heat exchanger (104), the second heat exchanger (105) and the third heat exchanger (109) can be a shell heat exchanger or a tube heat exchanger. In one embodiment, the third heat exchanger (109) is an air cooler.

The shell heat exchanger and tube heat exchanger is at least one selected from the group consisting of hair-pin type heat exchanger, dimple-tube type heat exchanger, corrugated tube type heat exchanger, and twisted tube type heat exchanger. Typically, the second pressurized feed and the pre-heated feed are allowed to pass through a plurality of tubes of the first heat exchanger (104) and the second heat exchanger (105), respectively. The temperature of the feed entering the shell side of feed heater can be monitored by a temperature transmitter, which is provided with a high temperature alarm to alert the operator and prevent overheating of the hot fluid system.

The reaction vessel (106) is at least one selected from a plug flow reactor (PFR), a continuous stirred tank reactor (CSTR) or combinations thereof. The process can be carried out in a standalone or combination of the CSTR and PFR, either in series or in parallel.

The system of the present disclosure further comprises a non-reformed feed storage tank (114) and biofuel storage tank (113). The non-reformed fluid storage tank (114) is adapted for receiving the non-reformed feed from the biofuel separator (112) and storing the non-reformed feed therein. The biofuel storage tank (113) is adapted for receiving the biofuel from the biofuel separator (112) and storing the biofuel therein.

The present disclosure in another aspect provides a process for producing biofuel from a feed. Typically, the feed can be selected from the group consisting of biomass, sludge and wastewater. The amount of biomass in the biomass slurry is in the range of 0.1 wt % to 40 wt %. The biomass can be an algal biomass or a non-algal biomass. The non-algal biomass can be selected from the group consisting of wood, bagasse in ethanol/water and black liquor/ethanol, starch, rice straw, cow manure, swine carcasses, soy protein, and the like. Typically, the algae can be selected from the group consisting of *Nannochloropsis, Spirulina, Chlorella, Dunaliella tertiolecta, Desmodesmus* and filamentous blue-green algae.

The process is described hereinafter in detail.

Initially, the feed is collected into the feed tank. The feed is pressurized up to 100 bar to obtain a first pressurized feed. A portion of the first pressurized feed is re-circulated back into the feed tank using the low pressure pump.

Typically, the low pressure pump is used to pressurize the feed and recirculate a portion of the pressurized feed into the feed tank. A high level and a low level alarm can be provided in the feed tank to alert the operator. The feed tank mixer has a variable frequency device (VFD) which allows for speed adjustment. A separate process water tank is also provided with similar arrangements as that of the feed tank except a mixer. At system start-up, process water will be fed to the system, until steady state conditions are met at process temperature and pressure. Once the system is fully stable, the process water is switched over to the feed. The process water tank can also be used to flush the system for shut-down.

The remaining portion of the first pressurized feed is introduced into the high pressure pump and the pressure of the first pressurized feed is increased up to 250 bar using the high pressure pump to obtain a second pressurized feed.

The second pressurized feed is introduced into the first heat exchanger to pre-heat the second pressurized feed to a temperature in the range of 200° C. to 290° C. to obtain a pre-heated feed.

The pre-heated feed is then introduced into the second heat exchanger to further heat the pre-heated feed to a temperature in the range of 291° C. to 400° C. to obtain a heated feed.

The heated feed from said second heat exchanger is introduced into the reaction vessel, where it is reformed for a time period in the range of 10 minutes to 60 minutes to obtain a slurry comprising solids, biofuel, and non-reformed fluid. In one embodiment, the feed rate is in the range of 1 $cm^3/s$ to 2 $cm^3/s$. However, the feed rate can be varied as per the process requirement.

In the reaction vessel, the feed undergoes a thermochemical reforming process at high temperature and pressure, where around 10% to 90% of the solids present in the feed break down into short-chain hydrocarbons. Subcritical water can act as a medium for the reaction. The reactors provide requisite residence time of 10 minutes to 60 minutes at the reaction temperature and pressure, while maintaining the feed at a velocity sufficient to minimize particulate settling. The reaction vessel is insulated and electrically heat traced to maintain the process temperature.

The slurry from the reaction vessel is introduced into the precipitation vessel, where the solids are separated from the slurry to obtain a liquid mixture comprising biofuel and non-reformed feed, having a temperature greater than 300° C. The liquid mixture from the precipitation vessel is re-circulated to the first heat exchanger for pre-heating the second pressurized feed, thereby cooling the liquid mixture to a temperature below 300° C. to obtain an intermediate cooled liquid mixture.

The slurry from reactor vessel, primarily comprising liquid (crude biofuel and water mixture), gas and solids enter the precipitation vessel, where the solids are precipitated out. They are further passed through pressure filters. The pressure filters can be of the sintered candle type. The solid products, primarily inorganic salts, which precipitate out, are retained in the filtration process. The system of the present disclosure facilitates the removal of solid products without disturbing the steady state operation. The solids are removed from the filters periodically by applying reverse differential pressure. Differential pressure readings between the inlet and outlet streams to the filters indicate the pressure drop across the filters. The solids sink to the bottom of the filter and the liquid products pass through the filter for further processing in separation units. The cleaning sequence of the filters can be timer based or can be initiated manually based on the differential pressure. The precipitation vessel and filters are insulated and electric heat traced to maintain the process temperature.

The intermediate cooled liquid mixture is then introduced into the first pressure let-down station where the pressure of the intermediate cooled liquid mixture is reduced to be in the range of 5 bar to 20 bar to obtain a de-pressurized liquid mixture.

The temperature of the de-pressurized liquid mixture is further reduced in the range of 30° C. to 100° C. using a third heat exchanger, to obtain a cooled liquid mixture The pressure of the cooled liquid mixture is reduced in the second pressure let-down station to below 5 bar, to obtain a gas-liquid mixture comprising gases and a mixture comprising biofuel and non-reforming feed.

The gas-liquid mixture from said second pressure let-down station is introduced into the gas-liquid separator for separating gases from said gas-liquid mixture, to obtain a mixture The mixture from the gas-liquid separator is introduced into the biofuel separator for separating the non-reformed feed from the mixture to obtain the biofuel. The biofuel and the non-reformed feed separator can be a weir type or a boot type.

The biofuel is stored in a biofuel storage tank, with the pressure controlled by a control valve on the vent line. A nitrogen blanket is provided from the purge nitrogen cylinder by control valve on the vent line maintaining the inert atmosphere in the biofuel storage tank. The tank is insulated and heat traced to maintain a pumpable viscosity in the biofuel. The non-reformed feed is stored in the non-reformed storage tank at atmospheric pressure.

In one embodiment, the process of the present disclosure is carried out in the presence of homogenous catalyst.

The system and the process of the present disclosure are capable of converting energy rich feed, into a readily usable form. The two-stage pressurization system used increases the pressure in a steady state manner. The first stage pump protects the high pressure pump and provides circulation of the feed tank. The system comprises heat integration system wherein heat recovery exchanger recovers heat from the product stream before separation and pre-heats the feed and hence reduces the heat load of final feed heater during the steady state operation. The two-stage pressure let down station of the system comprising an intermediate pressure let-down valve facilitates the drop in the system pressure without vaporization and hence avoids two-phase flow in the air cooler. The two phase flow in the air cooler reduces the cooler performance; therefore, the pressure in accordance with the process of the present disclosure is reduced in two stages. The present disclosure uses easily available and inexpensive starting material such as biomass, sludge and wastewater for producing biofuel, which the makes the process cost effective and environment friendly.

The present disclosure is further described in light of the following laboratory scale experiments which are set forth for illustration purpose only and not to be construed for limiting the scope of the disclosure. These laboratory scale experiments can be scaled up to industrial/commercial scale and the results obtained can be extrapolated to industrial/commercial scale.

EXPERIMENTAL DETAILS

Experiment 1: Simulation Process for Producing Biofuel in Accordance with the Present Disclosure The concept of the process for producing biofuel was performed on ASPEN HYSYS software. The fluid package used for the simulations was UNIQUAC.

The process was operated independently and in a continuous manner. The process contained the specific operational performance requirements for the unit operation in the system (100). The system (100) was designed to produce 1 barrel per day (bpd) biofuel wherein a wet feed was converted to crude oil at elevated temperatures (300° C. to 400° C.) while the pressure was maintained above the vapor pressure of water (209 bar, at the hereinabove mentioned temperature range) to facilitate a condensed-phase reaction medium, i.e., sub-critical phase of water.

An algal slurry to be processed was held in a stirred feed tank (101) at atmospheric conditions with a holding capacity of 8 hours runtime. The design throughput of the process was 110 kg/h. Low pressure feed pump (102) pressurized the algal slurry to 4 bar. The discharge of pump was introduced into the high pressure pump and there was a provision to recycle a stream back to feed tank. A high pressure pump (103) pressurized slurry to 209 bar before it was heated to 350° C. through a series of heat exchangers (104, 105). The first heat exchanger (104) pre-heated the slurry to a temperature of 290° C. and subsequently the second heat exchanger (105) raised the temperature to 350° C. The pressurized and heated slurry flowed to the plug flow reactor (PFR) in the reaction vessel (106). The PFR was designed based on the slurry velocity criteria of 2 cm/s. The conversions are shown in Table 1.

TABLE 1

| Conversion Percentage | |
| --- | --- |
| Component | Converted to Oil (%) |
| Other Lipid | 90 |
| Proteins | 50 |
| Carbohydrates | 40 |

Table-1 illustrates that the conversion rate using the system of the present disclosure is high.

The liquid product from the reaction vessel (106) then entered the precipitation vessel (107). The insoluble, especially the sulfates, the phosphates and the sand/dust precipitated out in the precipitation vessel (107). Two separate sintered filters were provided downstream of the precipitation vessel (107) with one filter in operation and the other in stand-by mode. The amount of solid separated was 13.36 kg/h. A back-flush provision with nitrogen for cleaning of filter elements was provided. The liquefied stream was then routed to the crude oil separation through heat recovery exchanger (104) where process temperature dropped to 100° C. The liquid product stream was flashed to 10 bar using the first pressure let-down station (108). The hot stream was cooled to 80° C. through an air cooler (109). The cooled stream was then flashed to 0.52 bar using the second pressure let-down stage (110) and then passed through a liquid/gas separator (111) and the non-condensable gas was sent to the Vent Gas Header. The biofuel/water separator (112) removed the biofuel product from the non-reformed feed. The biofuel was routed to a biofuel storage tank (113). The amount of the gases (111A), the biofuel (112A) and the non-reformed feed (112B) generated are shown in Table-2.

TABLE-2

Overall Mass Balance for the process

| Components | Flow rate | |
| --- | --- | --- |
| | Input (kg/h) | Output (kg/h) |
| Algal slurry | 110 | — |
| Biofuel | — | 7.33 |
| Effluent water | — | 88.61 |
| Solids | — | 13.36 |
| Gas | — | 0.69 |

The present disclosure provides a simple, efficient and stable process for the conversion of various types of feed to biofuel. The process utilizes the process heat for pre-heating the feedstock and hence results in better energy recovery.

Technical Advances and Economical Significance

The present disclosure described herein above has several technical advantages including, but not limited to, the realization of:

high conversion rate of the starting material to biofuel;
conversion of different types of starting material to biofuel;
efficient energy recovery from the biomass;
use of easily available and inexpensive starting material and
stable system operation.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A system for producing biofuel, said system comprising:

at least one feed tank adapted for receiving and storing a feed;

a low pressure pump adapted for:
pressurizing said feed up to 100 bar to obtain a first pressurized feed; and
recirculating at least a portion (a) of said first pressurized feed to and from said at least one feed tank;

a high pressure pump adapted for:
receiving said first pressurized feed from said low pressure pump; and
increasing the pressure of said first pressurized feed up to 250 bar to obtain a second pressurized feed;

a first heat exchanger adapted for:
receiving said second pressurized feed from said high pressure pump; and
pre-heating said second pressurized feed to a temperature in the range of 200° C. to 290° C. to obtain a pre-heated feed;

a second heat exchanger adapted for:
receiving said pre-heated feed from said first heat exchanger; and
further heating said pre-heated feed to a temperature in the range of 291° C. to 400° C. to obtain a heated feed;

a reaction vessel adapted for:
receiving said heated feed from said second heat exchanger; and
reforming said heated feed for a time period in the range of 10 minutes to 60 minutes to obtain a slurry comprising solids, biofuel, and non-reformed feed;

a precipitation vessel adapted for:
receiving said slurry from said reaction vessel; and
separating the solids (b) from said slurry to obtain a liquid mixture comprising biofuel and non-reformed feed having a temperature greater than 300° C.,
wherein said liquid mixture from said precipitation vessel is re-circulated to said first heat exchanger for pre-heating said second pressurized feed, thereby cooling said liquid mixture to a temperature below 300° C. to obtain an intermediate cooled liquid mixture;

a first pressure let-down station, adapted for:
receiving said intermediate cooled liquid mixture from said first heat exchanger; and
reducing the pressure of said intermediate cooled liquid mixture in the range of 5 bar to 20 bar, to obtain a de-pressurized liquid mixture;

a third heat exchanger adapted for:
receiving said de-pressurized liquid mixture from said first pressure let-down station; and
reducing the temperature of said de-pressurized liquid mixture to a temperature in the range of 30° C. to 100° C. to obtain a cooled liquid mixture having a pressure in the range of 5 bar to 20 bar;

a second pressure let-down station adapted for
receiving said cooled liquid mixture from said third heat exchanger; and reducing the pressure of said cooled liquid mixture below 5 bar, to obtain a gas-liquid mixture comprising gases and a mixture comprising biofuel and non-reformed feed;

a gas-liquid separator adapted for:
receiving said gas-liquid mixture from said second pressure let-down station; and
separating gases from said gas-liquid mixture to obtain a mixture comprising biofuel and non-reformed feed; and a biofuel separator adapted for:
receiving said mixture comprising biofuel and non-reformed feed from said gas-liquid separator; and
separating the non-reformed feed from said mixture to obtain the biofuel.

2. The system as claimed in claim 1 further comprising a process tank wherein said process tank is adapted to receive, store, and circulate a feed in said at least one feed tank, and wherein said feed is selected from the group consisting of biomass slurry, sludge and wastewater.

3. The system as claimed in claim 1, wherein said at least one feed tank comprises at least one agitator, a level controller, and at least one atmospheric vent.

4. The system as claimed in claim 1, wherein said precipitation vessel comprises at least one filter.

5. The system as claimed in claim 1, wherein said first heat exchanger, said second heat exchanger and said third heat exchanger is a shell and tube heat exchanger.

6. The system as claimed in claim 5, wherein the type of shell and tube heat exchanger is at least one selected from the group consisting of hair-pin type heat exchanger, dimple-tube type heat exchanger, corrugated tube type heat exchanger, and twisted tube type heat exchanger.

7. The system as claimed in claim 1, said reaction vessel is at least one of a plug flow reactor (PFR) and a continuous stirred tank reactor (CSTR).

8. The system as claimed in claim 1, further comprising:
a non-reformed feed storage tank adapted for receiving said non-reformed feed from said biofuel separator and storing said non-reformed feed therein; and
a biofuel storage tank adapted for receiving the bio-fuel from said biofuel separator and storing said bio-fuel therein.

9. The process as claimed in claim 1, wherein said second pressurized feed and said pre-heated feed are allowed to pass through a plurality of tubes of said first heat exchanger and second heat exchanger respectively.

10. The process as claimed in claim 1, wherein a fluid stream having a temperature above 400° C. is allowed to pass through the shell of said first heat exchanger and second heat exchanger respectively for heating said second pressurized feed and said pre-heated feed respectively.

11. A process for producing biofuel from a feed using the system, wherein said process comprises the following steps:
a) collecting feed into at least one feed tank;
b) pressurizing said feed up to 100 bar to obtain a first pressurized fluid;
c) recirculating at least a portion of said first pressurized feed into at least one feed tank;
d) increasing the pressure of the remaining portion of said first pressurized feed up to 250 bar to obtain a second pressurized feed;
e) pre-heating said second pressurized feed to a temperature in the range of 200° C. to 290° C. to obtain a pre-heated feed;
f) further heating said pre-heated feed to a temperature in the range of 291° C. to 400° C. to obtain a heated feed;
g) introducing said heated feed into a reaction vessel and reforming said heated feed for a time period in the range of 10 minutes to 60 minutes to obtain a slurry comprising solids, biofuel, and non-reformed feed;
h) separating said solids from said slurry to obtain a liquid mixture comprising biofuel and non-reformed feed having a temperature greater than 300° C., wherein said liquid mixture is re-circulated for pre-heating said second pressurized feed, thereby cooling said liquid mixture to a temperature below 300° C. to obtain an intermediate cooled liquid mixture;
i) reducing the pressure of said intermediate cooled liquid mixture in the range of 5 bar to 20 bar to obtain a de-pressurized liquid mixture;
j) reducing the temperature of said de-pressurized liquid to a temperature in the range of 30° C. to 100° C. to obtain a cooled liquid mixture;
k) reducing the pressure of said cooled liquid mixture to below 5 bar, to obtain a gas-liquid mixture comprising gases and a mixture comprising biofuel and non-reformed feed;
l) separating the gases from said gas-liquid mixture to obtain a mixture comprising biofuel and non-reformed feed; and
m) separating the non-reformed feed from said mixture to obtain the biofuel.

12. The process as claimed in claim 11, wherein said feed is at least one selected from the group consisting of biomass slurry, sludge and wastewater.

* * * * *